United States Patent
Fuerst et al.

(10) Patent No.: US 10,059,826 B2
(45) Date of Patent: Aug. 28, 2018

(54) PROCESS FOR PRODUCING ORGANOPOLYSILOXANE COMPOSITIONS

(71) Applicant: Wacker Chemie AG, Munich (DE)

(72) Inventors: Josef Fuerst, Mehring (DE); Sabrina von Bein, Emmerting (DE); Stefan Dietl, Burghausen (DE); Werner Fuchs, Julbach (DE); Norbert Hiltl, Mehring (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/368,847

(22) Filed: Dec. 5, 2016

(65) Prior Publication Data
US 2017/0174866 A1 Jun. 22, 2017

(30) Foreign Application Priority Data
Dec. 21, 2015 (DE) .................. 10 2015 226 241

(51) Int. Cl.
*C08G 77/20* (2006.01)
*C08K 3/36* (2006.01)
*C08J 3/205* (2006.01)
*C08J 3/21* (2006.01)

(52) U.S. Cl.
CPC ............ *C08K 3/36* (2013.01); *C08J 3/205* (2013.01); *C08J 3/212* (2013.01); *C08G 77/20* (2013.01); *C08J 2383/07* (2013.01)

(58) Field of Classification Search
None
See application file for complete search history.

(56) References Cited

U.S. PATENT DOCUMENTS

| | | | | |
|---|---|---|---|---|
| 4,737,561 A * | 4/1988 | Stary | ............. | B29B 7/7461 523/318 |
| 5,531,923 A * | 7/1996 | Le Blanc | ............. | C08K 9/06 252/182.14 |
| 5,721,307 A * | 2/1998 | Aoyama | ............. | B29B 7/42 264/211 |
| 6,124,392 A | 9/2000 | Heisler et al. | | |
| 6,388,001 B1 * | 5/2002 | Silvi | ............. | B29B 7/90 264/176.1 |
| 6,444,154 B1 * | 9/2002 | Boudreau | ............. | B29B 7/44 264/210.6 |
| 6,511,217 B1 * | 1/2003 | Silvi | ............. | B29B 7/007 366/321 |
| 2004/0192809 A1 * | 9/2004 | Heisler | ............. | B01F 13/1027 523/348 |
| 2006/0140048 A1 * | 6/2006 | Ulzheimer | ............. | B29B 7/485 366/84 |
| 2010/0152327 A1 | 6/2010 | Schuster et al. | | |

FOREIGN PATENT DOCUMENTS

| | | |
|---|---|---|
| EP | 0570387 A1 | 11/1993 |
| EP | 2 206 737 A1 | 7/2010 |
| EP | 2295222 A2 | 3/2011 |
| EP | 2295222 A3 | 3/2011 |
| WO | 92/13694 A1 | 8/1992 |
| WO | 01/46299 A2 | 6/2001 |

* cited by examiner

*Primary Examiner* — Robert S Loewe
(74) *Attorney, Agent, or Firm* — Brooks Kushman P.C.

(57) ABSTRACT

Organopolysiloxane compositions are prepared with high throughput and less process time, by a process in which organopolysiloxanes, processing aids and fillers are mixed and kneaded in the presence of water to give raw mixtures and the raw mixtures are subsequently devolatilized and freed of water in a heating and devolatilizing step at temperatures in the range from 100° C. to 250° C.

11 Claims, No Drawings

PROCESS FOR PRODUCING ORGANOPOLYSILOXANE COMPOSITIONS

CROSS-REFERENCE TO RELATED APPLICATIONS

This application claims priority to German Patent Application No. 10 2015 226 241.3 filed Dec. 21, 2015 which is herein incorporated by reference.

BACKGROUND OF THE INVENTION

1. Field of the Invention

The invention relates to a process for producing filler-containing organopolysiloxane compositions with the addition of water as a processing aid.

2. Description of the Related Art

Processes for producing filler-containing organopolysiloxane compositions are already known. Thus, EP 570387 A describes, for example, a process for the continuous production of HTV silicone compositions, in which the incorporation of the filler into the polysiloxane and the devolatilization are carried out in one step in an oscillating single-screw reciprocating kneader. Moreover, separation of the machine is possible, so that the mixing operation can take place in the first kneader and the devolatilization operation can take place in the second kneader. Furthermore, EP 2295222 A3 (General Electric) describes a process for producing hot-vulcanizing organopolysiloxane compositions in an extruder having a specific geometry.

SUMMARY OF THE INVENTION

The invention provides a process for producing organopolysiloxane compositions (A), in which organopolysiloxanes (O), processing aids (S) and fillers (F) are mixed and kneaded in the presence of water (W) to give raw mixtures and the raw mixtures are subsequently devolatilized and freed of water (W) in a heating and devolatilizing step at temperatures in the range from 100° C. to 250° C.

DETAILED DESCRIPTION OF THE PREFERRED EMBODIMENTS

The filler content of the organopolysiloxane compositions (A) produced according to the invention is preferably from 5 to 80% by weight, more preferably from 10 to 50% by weight, and most preferably from 20 to 40% by weight.

Possible fillers (F) are all fillers useful in silicone compositions, with mixtures of various fillers also being able to be used. Suitable fillers (F) are, for example, silicas, quartz flours, carbon blacks, metal oxides, metal carbonates, metal sulfates, metal silicates, metal nitrides, diatomaceous earth, clays, chalks, mica, metal powders, activated carbon, powders of organic polymers and also silicone resins. It is important that the viscosity of the filler-containing organopolysiloxane compositions (A) is, owing to the filler content, significantly higher than the viscosity of the organopolysiloxane (O) which is to be mixed to form this filler-containing silicone composition.

The fillers (F) which are used according to the invention are preferably reinforcing fillers, i.e. fillers having a specific BET surface area of at least 50 m$^2$/g, preferably from 50 to 500 m$^2$/g, e.g. to obtain the structure of dehydrated silica hydrogels, i.e. Aerogels, carbon blacks and also pyrogenic silicas which can optionally be surface-treated by known methods, for example using 1,1,1,3,3,3-hexamethyldisilazane (HMN) or 1,1,3,3-tetramethyl-1,3-divinyldisilazane (VMN), in order to, for example, improve the dispersibility thereof.

The fillers (F) which are used according to the invention are most preferably pyrogenic silicas, more preferably pyrogenic silicas having a BET surface area in the range of from 50 to 500 m$^2$/g, most preferably from 100 to 450 m$^2$/g. These particularly preferred pyrogenic silicas have a hydrophilic surface.

If the fillers (F) which are used according to the invention are organopolysiloxane resins, preference is given to pulverulent resins which are solid at room temperature and a pressure of 1013 hPA and in which more than 50% of the siloxane units are T- and/or Q-units.

In the process of the invention, it is also possible to use mixtures of hydrophilic and hydrophobicized oxidic reinforcing fillers as fillers (F).

The organopolysiloxanes (O) on which the organopolysiloxane composition (A) is based can be one organopolysiloxane (O) or a mixture of various organopolysiloxanes (O). In principle, it is possible to use all organopolysiloxanes (O) which are useful to those skilled in the art in the production of HTV, LSR, RTV-1 and RTV-2 compositions. These include linear, branched, cyclic or resin-like organopolysiloxanes which can optionally contain functional groups, usually for the purpose of crosslinkability.

The organopolysiloxanes (O) used according to the invention are preferably organopolysiloxanes containing units of the formula $$R^1_a R^2_b R^3_g SiO_{(4-a-b-g)/2} \quad (1),$$

where the radicals R$^1$ can be identical or different and are monovalent, SiC-bonded optionally halogen- or cyano-substituted hydrocarbon radicals having an aliphatic carbon-carbon multiple bond, the radicals R$^2$ can be identical or different and are monovalent, SiC-bonded, optionally halogen- or cyano-substituted hydrocarbon radicals which are free of aliphatic carbon-carbon multiple bonds, the radicals R$^3$ are identical or different monovalent Si-bonded radicals selected from among —H, —OH and —OR, where R is a monovalent hydrocarbon radical which can be interrupted by oxygen atoms, a is 0, 1, 2 or 3, preferably 0 or 1, b is 0, 1, 2 or 3, preferably 1, 2 or 3, and g is 0, 1, 2 or 3, preferably 0 or 1, in particular 0, with the proviso that the sum a+b+g is less than or equal to 3 and siloxanes (O) have at least 30, preferably at least 100, more preferably from 100 to 20,000, and in particular from 4000 to 10,000 units of the formula (1).

The organopolysiloxanes (O) are preferably organopolysiloxanes in which the sum (a+b+g) is equal to 2 in at least 50%, more preferably in at least 80%, of the units of the formula (1).

The radicals R$^1$ are preferably hydrocarbon radicals which have an aliphatic carbon-carbon multiple bond and from 2 to 10 carbon atoms, e.g. vinyl, allyl, methallyl, 1-propenyl, 5-hexenyl, ethynyl, butadienyl, hexadienyl, cyclopentenyl, cyclopentadienyl and cyclohexenyl radicals. The radicals R$^1$ are more preferably vinyl or allyl radicals, in particular vinyl radicals.

The radicals R$^1$ can be bound to the polymer chain in any position, in particular at the terminal silicon atoms.

The radical R$^2$ preferably has from 1 to 10 carbon atoms. Particular preference is given to the methyl or phenyl radical as radical R$^2$.

The radicals $R^3$ are preferably oxyalkylene radicals.

The structure of the polyorganosiloxanes (O) containing units of the formula (1) can be linear, cyclic, or branched.

The siloxanes (O) are preferably siloxanes consisting of units of the formula (1).

The organopolysiloxanes (O) used according to the invention are in particular organopolysiloxanes of the formula $$(ViMe_2SiO_{1/2})_c(ViMeSiO)_d(Me_2SiO)_e(Me_3SiO_{1/2})_f \quad (2),$$

where Vi is the vinyl radical and Me is the methyl radical and the indices c, d, e and f are 0 or integers, with the proviso that the sum c+d+e+f is in the range from 100 to 20,000, preferably from 4000 to 10,000.

Examples of siloxanes of the formula (2) are pure methylsiloxanes and methyl/vinylsiloxanes, where in the latter c, d, e and f preferably satisfy the following relationships: c+d≥1, c+f=2, 100<(d+e)<20,000, preferably 4000<(d+e) <10,000, and 0<(d+1)/(d+e)<1, preferably 0<(d+1)/(d+e) <0.1.

The linear siloxanes of the formula (2) used according to the invention can, even though not shown in formula (2), as a result of the production method have a molar proportion of branches, i.e. T- and/or Q-units, of preferably no more than 1%, more preferably no more than 1000 ppm, and in particular no more than 100 ppm.

The water (W) which is used according to the invention can be natural water, e.g. rainwater, groundwater, spring water and river water, chemical water, e.g. deionized water, distilled or (multiply) redistilled water, water for medical or pharmaceutical purposes, e.g. purified water (Aqua purificata; Pharm. Eur. 3), Aqua deionisata, Aqua destillata, Aqua bidestillata, Aqua ad injectionam or Aqua conservata, mains water conforming to the German mains water regulations and mineral water.

Deionized water is preferably used as water (W). The water (W) which is used according to the invention preferably has a conductivity of <100 µS/cm, more preferably <10 µS, in each case measured at 25° C. and 1013 hPa by means of a conductometric conductivity measuring electrode (e.g. electrode LR325/01 from WTW, EN 27888:1993).

The processing aid (S) used according to the invention preferably comprises organopolysiloxanes having from 2 to 25 siloxane units in which the radicals are preferably selected from among methyl, phenyl, vinyl and hydroxyl groups.

For the purposes of the present invention, the term organopolysiloxanes encompasses polymeric, oligomeric and also dimeric siloxanes. Examples of siloxanes (S) are trimethylsilyl-terminated polydimethylsiloxanes and dimethylhydroxysilyl-terminated polydimethylsiloxanes. Component (S) more preferably comprises substantially linear silanol-containing organopolysiloxanes having from 2 to 25 siloxane units.

The substantially linear siloxanes (S) which are used according to the invention can, as a result of the method of production, preferably have a molar proportion of branches, i.e. T- and/or Q-units, of up to 1%, more preferably up to 1000 ppm.

In the process of the invention, processing aids (S) are preferably used in amounts of from 0 to 40 parts by weight, more preferably from 2 to 30 parts by weight, in each case based on 100 parts by weight of siloxanes (O).

In addition to the siloxanes (O), fillers (F), processing aids (S) and water (W), it is possible to use further components, e.g. additives (Z), in the process of the invention. The additives (Z) can be all additives which are useful for producing organopolysiloxane compositions, and) are preferably dispersants, heat stabilizers, e.g. salts of rare earths, and additives which influence the rheology.

If additives (Z) are used in the process of the invention, they are preferably used in amounts of from 0.01 to 5 parts by weight, more preferably from 0.01 to 2 parts by weight, in each case based on 100 parts by weight of siloxanes (O).

Preference is given to using no further components in addition to the components (O), (F), (W), (S) and optionally (Z) in the process of the invention.

The components used in the process of the invention can in each case be one type of such a component or a mixture of at least two types of a respective component.

The process of the invention can be carried out continuously, batchwise or semicontinuously, with the continuous mode of operation being preferred.

The addition of water (W) in the process of the invention can be carried out in different ways, preferably i) by addition of water to organopolysiloxane (O), processing aid (S) and optionally additives (Z) before mixing with filler (F) and/or ii) by mixing of filler (F) with water (W) before mixing with organopolysiloxane (O), preferably by moistening the fillers (F).

The addition of water according to process variant i) can be carried out by simple mixing of the components.

The addition of water according to process variant ii) can be carried out by simple mixing of filler (F) and water (W). Here, water (W) can be used in liquid form or as water vapor, e.g. by introduction of water vapor into the feed hopper of the introduction of filler into the kneader cascade. In this way, the filler particles (F) are moistened, which then leads to improvement of the incorporation of filler (F) in the polymer (O).

In the process of the invention, water (W) is preferably used in amounts of from 0.1 to 20% by weight, more preferably from 0.1 to 2% by weight, yet more preferably from 0.3 to 0.8% by weight, and most preferably from 0.4 to 0.6% by weight, in each case based on the total weight of filler (F).

In the batchwise mode of operation, the addition of water (W) is preferably carried out according to variant i).

In the batchwise mode of operation, the process of the invention can be carried out in any mixers known hitherto, preferably in twin-cavity kneaders with discharge screw or in tilting kneaders.

In the continuous mode of operation, the addition of water (W) is preferably carried out according to variant i). In a preferred embodiment of the process of the invention, water (W) is metered into the continuous polymer stream containing the components (O), (S) and optionally (Z) and this mixture is intensively mixed, preferably in a separate kneading chamber, before the addition of filler (F).

In the continuous mode of operation, it is possible to use all mixing apparatuses which have hitherto been used for the continuous production of organopolysiloxane compositions, preferably twin-cavity kneaders with discharge screw or oscillating single-screw reciprocating kneaders, in each case optionally with upstream kneader cascade.

The process of the invention is preferably a continuous multistage process.

In the continuous process according to the invention, preference is given to organopolysiloxanes (O), fillers (F), processing aids (S) and optionally further components being intensively mixed and kneaded in the presence of water (W) in an oscillating single-screw reciprocating kneader in a first stage and this raw mixture being devolatilized and freed of water (W) in a second process stage at temperatures in the range from 100° C. to 250° C.

In the continuous process according to the invention, organopolysiloxanes (O), fillers (F), processing aids (S) and optionally further components are preferably mixed and kneaded in the presence of water (W) in a first stage in a kneader cascade having at least two kneading chambers which are connected in series and each contain two axially parallel, co-rotatable or counter-rotatable kneading tools and are connected to one another by openings through which passage can occur transverse to the axes of the kneading tools, where the first kneading chamber has a feed opening and the last kneading chamber has a discharge opening, to give raw mixtures. These raw mixtures are, in a second process stage, preferably devolatilized and freed of water (W) in a continuous oscillating single-screw reciprocating kneader or particularly preferably in a continuously operated twin-cavity kneader with discharge screw at temperatures in the range from 100° C. to 250° C.

In a preferred embodiment of the process of the invention, processing aids (S), optionally further components and water (W) are metered continuously into the stream of organopolysiloxanes (O), the resulting stream is intensively mixed in the first chamber of a kneader cascade and fillers (F) are subsequently mixed in and kneaded in the following chambers in a first process stage, where the first kneading chamber has a feed opening and the last kneading chamber has a discharge opening, and the raw mixture obtained is continuously devolatilized and freed of water (W) in an oscillating single-screw reciprocating kneader at temperatures in the range from 100° C. to 250° C. in a second process stage.

In a further preferred embodiment of the process of the invention, processing aids (S) and optionally further components are metered continuously into the stream of organopolysiloxanes (O), the resulting stream is intensively mixed in the first chamber of a kneader cascade and fillers (F) in admixture with water (W) are subsequently mixed in and kneaded in a first process stage, where the first kneading chamber has a feed opening and the last kneading chamber has a discharge opening, and the raw mixture obtained is devolatilized and freed of water (W) in a continuous oscillating single-screw reciprocating kneader at temperatures in the range from 100° C. to 250° C. in a second process stage.

In a preferred embodiment of the process of the invention, processing aids (S), optionally further components and water (W) are metered continuously into the stream of organopolysiloxanes (O), the resulting stream is intensively mixed in the first chamber of a kneader cascade and fillers (F) are subsequently mixed in and kneaded in the following chambers in a first process stage, where the first kneading chamber has a feed opening and the last kneading chamber has a discharge opening, and the raw mixture obtained is devolatilized and freed of water (W) in a continuously operated twin-cavity kneader with discharge screw at temperatures in the range from 100° C. to 250° C. in a second process stage.

In a further preferred embodiment of the process of the invention, processing aids (S), and optionally further components are metered continuously into the stream of organopolysiloxanes (O), the resulting stream is intensively mixed in the first chamber of a kneader cascade and fillers (F) in admixture with water (W) are subsequently mixed in and kneaded in a first process stage, where the first kneading chamber has a feed opening and the last kneading chamber has a discharge opening, and the raw mixture obtained is devolatilized and freed of water (W) in a continuously operated twin-cavity kneader with discharge screw at temperatures in the range from 100° C. to 250° C. in a second process stage.

In the batchwise embodiment of the process of the invention, organopolysiloxanes (O), processing aids (S) and water are placed in a batch kneader, e.g. twin-cavity kneader with discharge screw or a tilting kneader, and mixed, the fillers (F) are then added a little at a time until the total amount of fillers has been incorporated, the raw mixture formed is then degassed and freed of water (W) by heating at 150° C. for another 2 hours.

The process of the invention is preferably carried out under an inert gas atmosphere, e.g. nitrogen or argon, preferably nitrogen.

In the process of the invention, the oxygen content in the mixing apparatuses is preferably less than 5.0% by volume.

If premixes of the components used, for instance mixtures of organopolysiloxanes (O), processing aids (S), optionally further components and optionally water (W) or mixtures of fillers (F) and water (W), are produced separately in the process of the invention, this can be carried out under any conditions which permit very uniform mixing, preferably at temperatures of from 20 to 90° C. and ambient pressure, preferably 1013 mPa.

The first step of the process of the invention is preferably carried out at temperatures of from 45 to 230° C.

The second step of the process of the invention is preferably carried out at temperatures of from 100 to 230° C.

The process of the invention can be carried out at the pressure of the surrounding atmosphere, i.e. from 900 to 1100 hPa, or at lower pressures, e.g. pressures of less than 900 hPa.

If the process of the invention is carried out at the pressure of the surrounding atmosphere, this is preferably effected under inert gas, e.g. nitrogen, argon. The inert gas can, in particular, also be used in order to satisfy safety regulations. Furthermore, a specific inert gas stream can be fed in in order to be able to remove volatile constituents more readily (entrained gas).

The water (W) used according to the invention serves merely as auxiliary to improve the incorporation of filler (F) into the polymer (O) in the process of the invention. Water (W) is entirely or partly removed again from the product in the heating and devolatilizing step as per the second step of the process of the invention and can be treated further with the process offgas. Recirculation into the process after appropriate treatment is possible.

The organopolysiloxane compositions (A) produced by the process of the invention are preferably relatively highly viscous silicone compositions having a viscosity of at least 100 Pa·s measured at 25° C. using a rotational viscometer in the oscillation mode at a frequency of 1 Hz and a deformation of 0.1% at 25° C., e.g. from Anton Paar. The process of the invention is particularly suitable for producing relatively highly viscous organopolysiloxane compositions (A) having a Brabender plasticity measured at 25° C. of from 100 to 1000 daN·m and also very high-viscosity organopolysiloxane compositions (A) having a viscosity determined by the Mooney method of from 10 to 200 Mooney units (Mooney final value, ML(1+4), large rotor, 23° C., DIN 53523).

The organopolysiloxane compositions (A) produced by the process of the invention preferably have a water content of not more than 2000 ppm, more preferably from 100 ppm to 1000 ppm.

The process of the invention is particularly suitable for producing highly filled, highly viscous organopolysiloxane compositions (A), highly viscous silicone pastes and highly filled silicone masterbatches. The heat-curable HTV organopolysiloxane compositions (A1) can also be base mixtures which serve for production of crosslinkable HTV ready-to-use compositions. The process of the invention has the advantage that the throughputs in the continuous production of silicone compositions, in particular HTV, can be increased significantly by addition of water as processing aid.

The process of the invention has the advantage that the mixing of fillers into the polymer proceeds with smaller torque fluctuations as a result of the addition of water as processing aid and the process can thus be carried out with improved stability.

Furthermore, the process of the invention has the advantage that the improved incorporation of filler into the polymer shortens the kneading time in the kneading apparatus, as a result of which the throughput can be increased while maintaining the same product quality. In the very particularly preferred multistage continuous embodiment of the process of the invention, throughput increases by a factor of from 1.2 to 2, compared to processes without addition of water, can be attained.

The process of the invention has the advantage that in the batchwise mode of operation, the incorporation of the fillers is improved by the addition of water to the organopolysiloxane, in particular HTV solid polymer. This shortens the cycle times of the filler introductions, which leads to a reduction in the plant occupation times.

In the following examples, all amounts and percentages are weight-based and all pressures are 0.10 MPa (abs.), unless indicated otherwise in the particular case. All viscosities were determined at 23° C. (DIN 53523).

All examples which demonstrate the process of the invention and also comparative examples were carried out using a silicone rubber composition comprising the following raw materials:
Organopolysiloxane:
HTV polymer which at a temperature of 25° C. and a shear rate of 0.81 l/sec has a viscosity of about 20,000 Pa·s and according to the 1H-NMR spectrum has the following number-average composition:

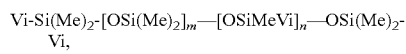
Vi-Si(Me)$_2$-[OSi(Me)$_2$]$_m$—[OSiMeVi]$_n$—OSi(Me)$_2$-Vi, where Me is the methyl radical and Vi is the vinyl radical, n+m is about 6000 and m/n is about 3000;
Processing Aid:
Processing aid which according to the $^{29}$Si-NMR spectrum has the following number-average composition:

HO—Si(Me)$_2$-[OSi(Me)$_2$]$_m$—OSi(Me)$_2$-OH, where m is about 14 and the viscosity measured at a temperature of 25° C. is 41 mm2/s;
Filler:
Pyrogenic silica obtainable under the name HDK® T30 from Wacker Chemie AG, D-Munich, having a specific surface area measured by the BET method of 300 m$^2$/g; and
Water as Processing Aid:
Distilled water Example 1

A Conterna® kneader cascade from IKA Maschinenbau Janke & Kunkel GmbH & Co. KG, Staufen, was used for the first stage. The kneader cascade had 6 chambers each having a volume of 10 l.

The polymer was metered (172 kg/h) by means of a gear pump into the feed conduit to chamber 1, additionally the processing aid (19.5 kg/h) and water (0.3 kg/h) (via two separate introduction points into the polymer stream), and the filler (69 kg/h) into the feed conduit to chamber 2. The total throughput was accordingly about 260 kg/h.

The speeds of rotation in chambers 1-4 were 35 rpm. In chambers 5 and 6, after-kneading was carried out at 40 rpm, and at the same time the product was discharged from chamber 6. The 6 chambers were not cooled and not heated and the temperatures ranged from about 45° C. in the 1st chamber to about 150° C. in the 6th chamber. The raw rubber discharged from chamber 6 was taken off continuously (30 kg/h) via a connecting piece and fed continuously by means of an AZ feeder from Krauss Maffei, which served as transport device, into a 100 l sigma-kneader provided with lamp, vacuum connection, sight glass and discharge screw. The kneader was heated to about 200° C. and evacuated to a subatmospheric pressure of about 100 mbar, resulting in water being removed from the product. After the kneader had been half-filled, product was discharged continuously via the discharge screw. The amount discharged was set so that the degree of fill of the kneader remained approximately constant.

Silicone compositions having a Mooney viscosity of 45 and a water content of 600 ppm are obtained.

Comparative Example 1

The procedure described Example 1 is repeated with the modification that no water was used and the streams at a total throughput of 200 kg/h were as follows:
The polymer was metered (132 kg/h) into the feed conduit to chamber 1, additionally the processing aid (15 kg/h), and the filler (53 kg/h) into the feed conduit to chamber 2.

Silicone compositions having a Mooney viscosity of 45 and a water content of about 600 ppm are obtained.

Example 2

A Conterna® kneader cascade from IKA Maschinenbau Janke & Kunkel GmbH & Co. KG, Staufen, was used for the first stage. The kneader cascade had 5 chambers each having a volume of 50 l.

The polymer was metered continuously (728 kg/h) by means of a gear pump into the feed conduit to chamber 1. Metering was effected gravimetrically with the aid of a differential metering balance. The processing aid (80 kg/h) was metered by means of a gear pump into the stream of the polymer, and water was metered in by means of a diaphragm pump (1.5 kg/h). The amounts were in each case monitored by means of mass flow meters. The filler (292 kg/h) was fed with the aid of a differential metering balance via a feed screw into the feed conduit to chamber 2. The total throughput was consequently about 1100 kg/h.

The speeds of rotation in chambers 1-4 were 50 rpm. Chamber 5 served for discharge of the product and was operated at a speed of rotation of 1.5 rpm. The 5 chambers were not cooled and not heated and the temperatures ranged from about 45° C. in the 1st chamber to about 150° C. in the 5th chamber.

The raw rubber discharged from chamber 5 was continuously fed directly via a connecting piece into a reciprocating kneader model LR 300/19D from "Buss Compounding Systems AG".

The kneader was divided into 5 zones (barrels) having the following structure: 1st zone 3D, 2nd-5th zone each 4D. A subatmospheric pressure of 500 mbar (abs.) was applied by means of a water-ring vacuum pump. The heating/cooling of the individual barrels and the shaft of the kneader were selected so that a product temperature along the kneader commencing from the second barrel of from 180 to 200° C. was established at a speed of rotation of the shaft of 110 rpm. The raw mixture produced by means of the kneader cascade was introduced at a product temperature of about 150° C. into zone 1 of the reciprocating kneader. In zones 2-5, it was intensively kneaded and volatile constituents and water were removed from the rubber compositions in the process. The rubber was discharged by means of a cooled discharge screw. Silicone compositions having a Mooney viscosity of 45 and a water content of about 600 ppm are obtained.

Comparative Example 2

The procedure described in Example 2 is repeated with the modification that no water was used and the streams at a total throughput of 700 kg/h were as follows:
The polymer was metered continuously (464 kg/h) into the feed conduit to chamber 1, additionally the processing aid (51 kg/h) into the polymer stream, and the filler (185 kg/h) into the feed conduit to chamber 2.
The examples show that the throughput can be increased considerably by the addition of water. Measurements carried out on the target composition show an identical moisture content, regardless of the additional water.

Example 3

The use of water for improving the incorporation of filler into the mixture of organopolysiloxane and processing aid can also occur in batch processes.
A: Example without Water as Comparison
1060 kg of organopolysiloxane, 116 kg of processing aid were placed at 50° C. in a batch kneader (twin-cavity kneader with discharge screw, trough volume: about 5 m³) under a nitrogen atmosphere and an oxygen content of less than 5% by volume and mixed for 5 minutes. 424 kg of the filler were then added in 8 portions. Addition of each portion of filler was followed by a delay time of 2 minutes during which the filler was kneaded into the mixture of organopolysiloxane and processing aid. After all the filler had been added, the mixture was heated at 150° C. for another 2 hours.
B: Example with Water According to the Invention
1060 kg of organopolysiloxane, 116 kg of processing aid and 2.0 kg of water were placed at 50° C. in a batch kneader (twin-cavity kneader with discharge screw, trough volume about 5 m³) and mixed for 5 minutes. 424 kg of filler were then added continuously from a reservoir. The filler does not have to be added in portions, and the delay times for kneading-in are omitted. After all the filler has been introduced, the mixture is heated at 150° C. for another 2 hours.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A process for producing an organopolysiloxane composition, comprising:
a) mixing an organopolysiloxane, optional processing aid, and filler, by kneading in the presence of added water to provide a raw mixture, and
b) removing added water from the raw mixture obtained in step a) by devolatilizing in a heating and devolatilizing step at a temperature in the range of 100° C. to 250° C.,
wherein the organopolysiloxane comprises one or more organopolysiloxanes comprising units of the formula

$$R^1_a R^2_b R^3_g SiO_{(4-a-b-g)/2} \quad (1),$$

where
the radicals $R^1$ are identical or different and are monovalent, SiC-bonded optionally halogen- or cyano-substituted hydrocarbon radicals having an aliphatic carbon-carbon multiple bond,
the radicals $R^2$ are identical or different and are monovalent, SiC-bonded, optionally halogen- or cyano-substituted hydrocarbon radicals which are free of aliphatic carbon-carbon multiple bonds,
the radicals $R^3$ are identical or different monovalent Si-bonded radicals selected from the group consisting of —H, —OH and —OR, where R is a monovalent hydrocarbon radical which is optionally interrupted by oxygen atoms,
a is 0, 1, 2 or 3,
b is 0, 1, 2 or 3, and
g is 0, 1, 2 or 3,
with the proviso that the sum a+b+g is less than or equal to 3 and the organopolysiloxanes have at least 30 units of the formula (1),
where no processing aid is added.

2. A process for producing an organopolysiloxane composition, comprising:
a) mixing an organopolysiloxane, optional processing aid, and filler, by kneading in the presence of added water to provide a raw mixture, and
b) removing added water from the raw mixture obtained in step a) by devolatilizing in a heating and devolatilizing step at a temperature in the range of 100° C. to 250° C.
wherein the organopolysiloxane comprises one or more organopolysiloxanes comprising units of the formula

$$R^1_a R^2_b R^3_g SiO_{(4-a-b-g)/2} \quad (1),$$

where
the radicals $R^1$ are identical or different and are monovalent, SiC-bonded optionally halogen- or cyano-substituted hydrocarbon radicals having an aliphatic carbon-carbon multiple bond,
the radicals $R^2$ are identical or different and are monovalent, SiC-bonded, optionally halogen- or cyano-substituted hydrocarbon radicals which are free of aliphatic carbon-carbon multiple bonds,
the radicals $R^3$ are identical or different monovalent Si-bonded radicals selected from the group consisting of —H, —OH and —OR, where R is a monovalent hydrocarbon radical which is optionally interrupted by oxygen atoms,
a is 0, 1, 2 or 3,
b is 0, 1, 2 or 3, and
g is 0, 1, 2 or 3,
with the proviso that the sum a+b+g is less than or equal to 3 and the organopolysiloxanes have at least 30 units of the formula (1),
wherein a processing aid is added, and the added water serves only as an auxiliary which improves incorporation of filler into the organopolysiloxane during preparation of the organopolysiloxane composition.

3. The process of claim 2, wherein a processing aid is added, and the processing aid consists of one or more hydroxyl-terminated organopolysiloxanes.

4. The process of claim 2, wherein the amount of added water removed in step b) is substantially the same as the water added in step a).

5. The process of claim 2, wherein the processing aid is added, and the processing aid comprises a hydroxyl-functional organopolysiloxane having the formula $$HO-Si(Me)_2-[OSi(Me)_2]_m-OSi(Me)_2-OH,$$

wherein m is an integer from 0-23.

6. The process of claim 2, wherein a processing aid is added, and the processing aid consists essentially of a trimethylsilyl-terminated polydimethylsiloxane, a dimethylhydroxylsilyl-terminated polydimethylsiloxane, or mixture thereof.

7. The process of claim 2, wherein a processing aid is added, and the processing aid consists of a trimethylsilyl-terminated polydimethylsiloxane, a dimethylhydroxylsilyl-terminated polydimethylsiloxane, or mixture thereof.

8. A process for producing an organopolysiloxane composition, comprising:
   a) mixing an organopolysiloxane, optional processing aid, and filler, by kneading in the presence of added water to provide a raw mixture, and
   b) removing added water from the raw mixture obtained in step a) by devolatilizing in a heating and devolatilizing step at a temperature in the range of 100° C. to 250° C., wherein the organopolysiloxane comprises one or more organopolysiloxanes comprising units of the formula $$R^1_a R^2_b R^3_g SiO_{(4-a-b-g)/2} \quad (1),$$

where
   the radicals $R^1$ are identical or different and are monovalent, SiC-bonded optionally halogen- or cyano-substituted hydrocarbon radicals having an aliphatic carbon-carbon multiple bond,
   the radicals $R^2$ are identical or different and are monovalent, SiC-bonded, optionally halogen- or cyano-substituted hydrocarbon radicals which are free of aliphatic carbon-carbon multiple bonds,
   the radicals $R^3$ are identical or different monovalent Si-bonded radicals selected from the group consisting of —H, —OH and —OR, where R is a monovalent hydrocarbon radical which is optionally interrupted by oxygen atoms,
a is 0, 1, 2 or 3,
b is 0, 1, 2 or 3, and
g is 0, 1, 2 or 3,
with the proviso that the sum a+b+g is less than or equal to 3 and the organopolysiloxanes have at least 30 units of the formula (1), wherein organopolysiloxane, filler, processing aid and optionally further components, are intensively mixed and kneaded in the presence of added water in an oscillating single-screw reciprocating kneader in step a) to form the raw mixture, and the raw mixture is degassed and added water is removed in step b) at temperatures in the range of from 100° C. to 250° C.

9. The process of claim 8, wherein the added water removed in step b) is recirculated and reused in a step a).

10. A continuous process for producing an organopolysiloxane composition, comprising:
   a) mixing an organopolysiloxane, processing aid, and filler, by kneading in the presence of added water to provide a raw mixture, and
   b) removing added water from the raw mixture obtained in step a) by devolatilizing in a heating and devolatilizing step at a temperature in the range of 100° C. to 250° C., wherein the organopolysiloxane comprises one or more organopolysiloxanes comprising units of the formula $$R^1_a R^2_b R^3_g SiO_{(4-a-b-g)/2} \quad (1),$$

where
   the radicals $R^1$ are identical or different and are monovalent, SiC-bonded optionally halogen- or cyano-substituted hydrocarbon radicals having an aliphatic carbon-carbon multiple bond,
   the radicals $R^2$ are identical or different and are monovalent, SiC-bonded, optionally halogen- or cyano-substituted hydrocarbon radicals which are free of aliphatic carbon-carbon multiple bonds,
   the radicals $R^3$ are identical or different monovalent Si-bonded radicals selected from the group consisting of —H, —OH and —OR, where R is a monovalent hydrocarbon radical which is optionally interrupted by oxygen atoms,
a is 0, 1, 2 or 3,
b is 0, 1, 2 or 3, and
g is 0, 1, 2 or 3,
with the proviso that the sum a+b+g is less than or equal to 3 and the siloxanes have at least 30 units of the formula (1), wherein the process takes place in a first process stage in a kneading cascade, wherein all of the organopolysiloxane, processing aid, filler, and water are mixed intensively.

11. The continuous process of claim 10, wherein added water is metered into a continuous stream comprising organopolysiloxane, processing aid, and optionally further components to form a water-containing continuous stream, and this water-containing continuous stream is then introduced into the first chamber of the kneading cascade.

\* \* \* \* \*